(No Model.)
J. BURRY.
CLUTCH AND MEANS FOR OPERATING SAME.
No. 540,420. Patented June 4, 1895.
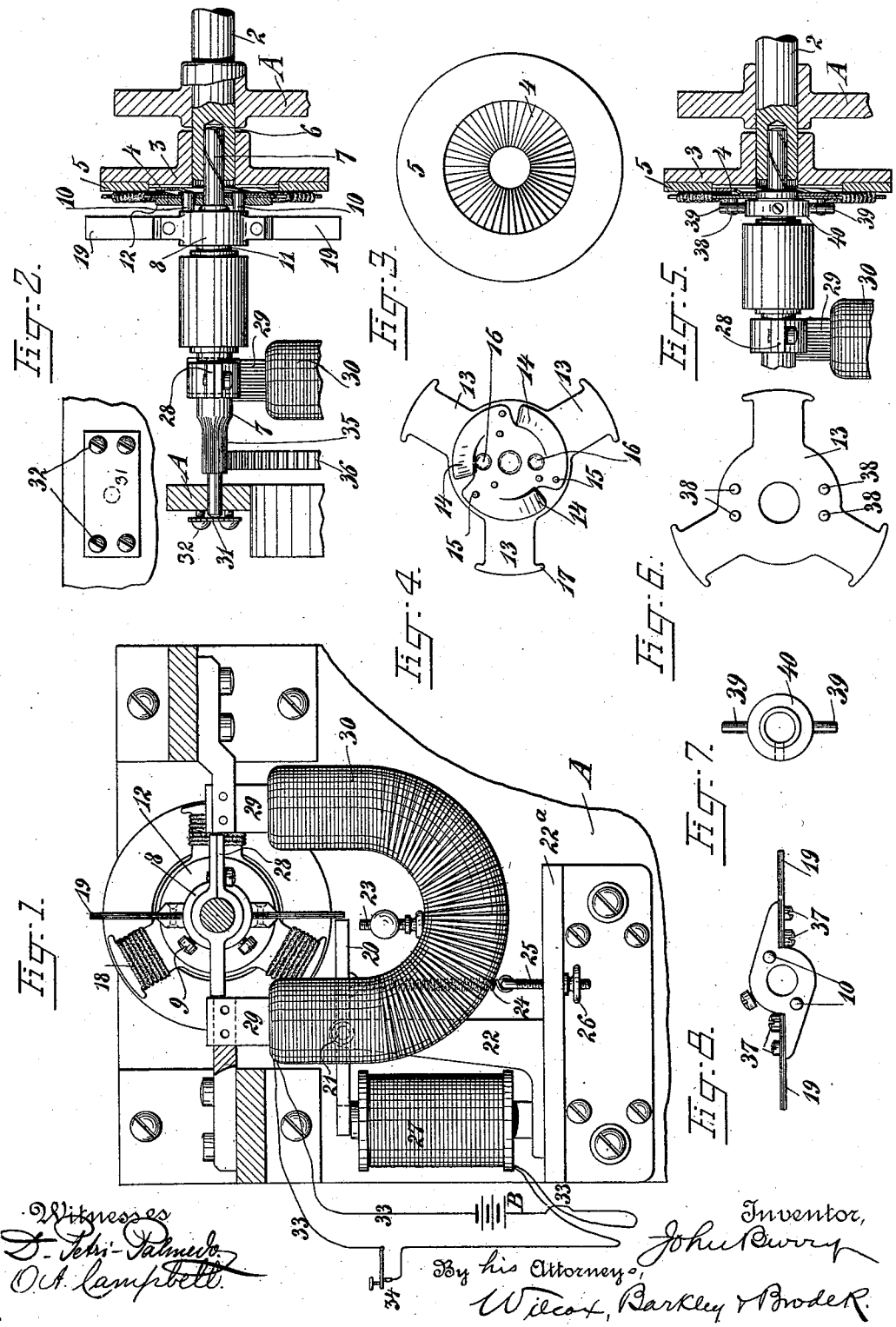

UNITED STATES PATENT OFFICE.

JOHN BURRY, OF LONG ISLAND CITY, NEW YORK.

CLUTCH AND MEANS FOR OPERATING SAME.

SPECIFICATION forming part of Letters Patent No. 540,420, dated June 4, 1895.

Application filed April 16, 1894. Serial No. 507,795. (No model.)

*To all whom it may concern:*

Be it known that I, JOHN BURRY, a citizen of the United States, and a resident of Long Island City, in the county of Queens and State of New York, have invented certain new and useful Improvements in Clutches and Means for Operating the Same, of which the following is a specification.

This invention relates to mechanical clutches or couplings and means for operating the same, an object being the absolute control of the clutch at any predetermined point or fraction of a revolution thereof at any time, whether periodic or arbitrary.

Another object, in the case of a friction-clutch, is to decrease or remove altogether the friction between the members thereof whenever the driven parts are stopped.

Other objects will hereinafter appear from the description of the invention.

According to this invention, there are combined with a member of the clutch (usually the driven member) an electro-magnet (or solenoid) and a projecting-pole armature, one of which elements is connected to, rotates with and controls the clutch-member, and the other of which is fixed or stationary, the poles of the rotating electro-element while rotating approaching and receding from the poles of the fixed electro-element. In some cases, the driven member of the clutch is moved away from the driving member for the purpose of decreasing or removing the friction between them while the stoppage lasts, this moving being done by electro-magnetic force, and preferably by means of the projecting-pole armature and its co-operating electro-magnet (or solenoid) the poles of which parts are so placed with respect to each other that the line joining (or the plane of) the poles of the rotating electro-element while rotating is to one side of the line joining (or the plane of) the poles of the fixed electro-element, whereby the rotating element is not only stopped but is moved in a direction at right angles to its plane of rotation whenever the poles of the electro-magnet (or solenoid) are energized or rendered active. In some cases, a mechanical detent or stop-device may be used in connection with and as an auxiliary to the electro-magnetic stop, the said detent being operated by the same electro-magnet or another one, as may be preferred in any given case. Again, in cases where the load on the driven member of the clutch is light, it sometimes happens that the attraction of the poles of the electro-magnetic elements for each other when the electro-magnet is energized causes an acceleration of the speed of the said driven member, and so interferes somewhat with the accurate and quick stoppage thereof. To prevent this difficulty or defect, there are provided suitable means for preventing the driven member from outrunning the driver member.

The invention is shown in the accompanying drawings, forming part of this specification, in which—

Figure 1 is a sectional end elevation showing a friction-clutch, a shaft driven thereby, a projecting-pole armature fast on said shaft, a fixed electromagnet, an electromagnetically-operated mechanical detent for the driven clutch member and shaft, and electric connections. Fig. 2 is a sectional side view showing the friction-clutch and the other members shown in Fig. 1, as well as gearing and a spring pressing the clutch members together. Fig. 3 is a face view of the driving member of the friction-clutch, showing ratchet-teeth thereon. Fig. 4 is a face view of the driven member of the clutch, showing pawls thereon for coaction with the ratchet-teeth of the driver member of the clutch. Fig. 5 is a view showing a friction-clutch, a projecting-pole armature, and its co-operating electromagnet, but omitting the mechanical detent device above named. Fig. 6 is a back view of the driven member of the friction-clutch shown in Fig. 5. Fig. 7 is an end view of the sleeve shown in Fig. 5 as connecting the driven member of the clutch with the shaft, and Fig. 8 is a view showing a method different from that shown in Figs. 1 and 2 for connecting the mechanical stop members with the shaft or driven member of the clutch.

Referring to the drawings, the reference letter A marks a standard or framing in which the moving parts are mounted. Journaled in this framework is the drive-shaft 2 which is driven by any suitable means and which has fast upon it a disk 3, which disk is provided with ratchet teeth 4 and a friction face or ring 5. This shaft 2 is bored, as at 6, to form a bearing for the shaft 7 which is also journaled in the frame A.

Upon shaft 7 is fixed a sleeve 8, as by a set screw 9, which sleeve is provided with pins 10 projecting toward the disk 3. This sleeve 8 is shown as resting against the shoulder 11 of the shaft 7, which is shown as having a second shoulder on the other side of the sleeve, against which last named shoulder the disk 12 rests.

The spring fingers 13 and the pawls or detents 14 are secured to the disk 12 by rivets, pins or screws 15, and these parts are perforated as at 16 to receive the pins 10 before mentioned. The fingers 13 are provided with T-heads 17 to hold the fibrous wrapping 18, which is of silk, cotton, yarn or other material, as may be desired, and which bears against the friction ring 5 above named.

To the sleeve 8 are fast the arms 19, which are preferably of a resilient nature. These arms 19 are preferably laminated, and co-act with the end of the lever or detent 20 to stop the shaft 7.

The lever 20 is pivoted at 21 upon a standard 22 of the framework, and is normally held out of the path of arms 19 and against the adjustable screw-stop 23 by means of a spring 24 fast thereto and to the threaded rod 25, which passes through the bracket 22ᵃ and which is held in place by the threaded nut 26. The stop 20 carries or forms the armature of the electro-magnet 27, which is supported on the framework. The stop-arms (19) are equal in number to the projecting-poles of the armature (28), are symmetrically disposed about the shaft 7, and are so placed that they strike the end of the stop 20 as the armature-poles come into line with or approach nearest to the magnet-poles.

The shaft 7 is provided with a projecting-pole armature 28 which is fast thereto, and rotates therewith and so with the driven member of the friction clutch.

Supported upon the framework A are the poles 29 of the horse-shoe electro-magnet 30.

The armature 28 is preferably so placed upon the shaft 7 that, when the electro-magnet is de-energized, the spring 31 will move the shaft endwise so that the plane, perpendicular to the shaft 7, through the armature-pole centers, will be to one side of a like plane through the magnet-pole centers, and bring the driven-member of the clutch against the driver or increase the friction between them. The spring 31 is held in place by screws 32 which may be used to adjust its tension.

The magnets 27 and 30 may be connected in series or in multiple-arc with the battery B or other source of electric energy by the electric circuit 33, which may be opened and closed in any suitable or desired way, either periodically or arbitrarily. There is shown a key or circuit closer 34 for closing the same arbitrarily, but this circuit closer may be replaced by one which will periodically close and open the circuit and so operate the clutch. It is obvious that such periodic closing of the circuit may be at the end of any fraction of a revolution of the clutch; or after the same shall have made any number of revolutions; for the projecting-pole armature (or the magnets) may be on a part geared to the clutch-member, which gearing may cause any desired differences in the rotations of the said parts. Again, a moving part of the mechanism driven by shaft 7 may close the circuit 33. Upon closing the electric circuit, whatever may be the position of the armature 28, the magnets 27 and 30 are energized, the stop 20 is lifted, and as the poles of the armature 28 approach the poles 29, they are brought to rest by well known laws of electro-magnetism; and, with the construction shown in Figs. 1, 2 and 5, are drawn at right angles to their plane of rotation, that is to say, in the direction of the axis of the shaft 7 until the line joining the armature-pole-centers coincides with (or nearly so) the line joining the pole-centers of the electro magnet 30. This stops the shaft 7 and any mechanism driven thereby, at the same time reducing or altogether removing the friction between the members of the clutch. The pawls 14 upon the face of the driven member of the clutch prevent, by their co-action with the ratchet 4, any acceleration of the speed of rotation of the shaft 7, which might otherwise be caused by the magnetic pull between the armature-poles and the magnet-poles. These pawls 14 are of such a length that but one of them at a time is in engagement with the face of a tooth of the ratchet 4. This is in accordance with a well-known construction of such devices, for avoiding too great fineness of the teeth of a ratchet wheel.

The shaft 7 may drive any tool or mechanism, and is shown as having a gear 35 thereon which meshes with a gear 36 to drive the same.

In the construction shown in Figs. 1 and 2, the arms 19 are riveted between jaws of the sleeve 8. In the construction shown in Fig. 8 the arms 19 are held in place by screws 37.

In the construction shown in Figs. 5, 6, and 7, the disk 12 is omitted, and the spring fingers 13 are provided with two sets of pins 38 at opposite sides thereof, which pins engage the pins or studs 39 of the collar 40, which is placed upon the shaft 7 and is held in place by a set screw or pin. The other parts shown in these figures are or may be as hereinbefore described.

While there is shown a projecting-pole armature having but two poles and an electro-magnet also having but two poles, it is obvious that the armature may be replaced by another having any greater number of poles symmetrically disposed about the center of the shaft 7, and that the poles of the electro-magnet would be so placed as to co-act with two of these poles; or the electro-magnet in such case may be replaced by one having a greater number of poles which would be symmetrically disposed about the center of shaft 7 to co-act with two or more of the poles of the armature; also, there may be more than one such electro-magnet 30, whose poles would be likewise symmetrically disposed. It is also obvious that the electro-magnet 30 can be made to operate the detent-device 20 in cases where that is employed, thus dispensing with the magnet 27.

While the projecting-pole armature has been shown as mounted upon the shaft 7 and the magnet 30 as fixed upon the framework, it is obvious that their positions may be reversed, in which case the electrical connections to the magnet would include a well-known construction wherein a couple of rings upon the shaft 7, are insulated from each other and the shaft, and are electrically connected with the magnet and with the source of electric energy.

Many other changes in details and in the arrangement of parts and in replacing groups of mechanism by other mechanisms may be made without departing from the spirit of this invention.

Having thus fully described my invention, what I claim as new, and desire to secure by Letters Patent, is—

1. The combination with the driven member of a clutch, of electro-magnet poles and a projecting-pole armature therefor, one of the latter elements rotating with and controlling the said member and the poles of said element during their revolutions approaching and receding from the poles of the other element, whereby, on energizing the magnet poles, the rotating element and driven clutch-member are stopped, substantially as described.

2. The combination with the driven member of a clutch, of electro-magnet poles and a projecting-pole armature therefor, one of the latter elements rotating with and controlling the said member and the poles of said element during their revolutions approaching and receding from the poles of the other element and so placed that they are to one side of the line joining (or the plane of) the poles of the other element, whereby, on energizing the magnet poles, the rotating element and driven clutch-member are stopped, and moved away from the driving member, substantially as described.

3. The combination with the driven member of a clutch, of a projecting-pole armature rotating with and controlling said member, and stationary electro-magnet poles, the poles of said armature approaching and receding from the magnet-poles during the rotation of the armature, whereby the armature and clutch-member are stopped when the magnet-poles are active, substantially as described.

4. The combination with the driven member of a clutch, of a projecting-pole armature rigidly connected to the same, stationary electro-magnet-poles, the said armature being so placed with respect to the said magnet-poles that the line joining (or the plane of) its pole-centers while revolving is to one side of the line joining (or the plane of) the magnet-poles, whereby the armature and clutch-member are stopped and simultaneously moved away from the driving member when the magnet-poles are active, and means for normally closing the clutch, substantially as described.

5. The combination of the members of a friction-clutch, electro-magnet poles and a projecting-pole armature therefor, one of the last two elements rotating with and controlling the said driven member of the clutch and its poles approaching and receding from the poles of the other during said rotations, with devices connecting the members of the clutch to prevent the driven member thereof from out-running the driver member when the magnet poles are energized to stop the driven member, substantially as described.

6. The combination of the members of a friction-clutch, electro-magnet poles and a projecting-pole armature therefor, one of the last two elements rotating with and controlling the said driven member of the clutch and its poles approaching and receding from the poles of the other during said rotations, with a pawl-and-ratchet connection between the members of the clutch to prevent the driven member thereof from out-running the driving member when the magnet poles are energized to stop the driven member, substantially as described.

7. The combination of the members of a friction-clutch, stationary electro-magnet-poles, and a projecting-pole armature rotating with and controlling the driven member of the clutch, the poles of said armature in rotating approaching and receding from the magnet-poles, with devices connecting the members of the clutch to prevent the driven member from out-running the driver member when the magnet or magnets are energized to stop the driven member, substantially as described.

8. The combination of the members of a friction-clutch, stationary electro-magnet-poles, and a projecting-pole armature rotating with and controlling the driven member of the clutch, the poles of said armature approaching and receding from the magnet-poles during the rotation of the armature, with a pawl-and-ratchet connection between the members of the clutch to prevent the driven member from out-running the driver member when the magnet-poles are energized to stop the driven member, substantially as described.

9. The combination of the members of a friction-clutch, stationary electro-magnet-poles, a projecting-pole armature therefor rigidly connected to the driven member of the clutch, said armature-poles approaching and receding from the magnet-poles during the rotation of the former and being so placed with respect thereto that, while revolving, the line joining (or the plane of) the armature-poles is to one side of the line joining (or the plane of) the magnet-poles, means pressing said members of the clutch together, and devices connecting the members of said clutch to prevent the driven member from out-running the driver, when the magnet-poles are energized to stop the driven member and decrease or remove the friction, substantially as described.

10. The combination of the members of a friction-clutch, stationary electro-magnet-poles, a projecting-pole armature therefor rigidly connected to the driven member of the clutch, said armature-poles approaching and receding from the magnet-poles during the rotation of the former and being so placed with respect thereto that, while revolving, the line joining (or the plane of) the armature-poles is to one side of the line joining (or the plane of) the magnet-poles, means pressing said members of the clutch together, and a pawl-and-ratchet connection between the members of said clutch to prevent the driven member from out-running the driver, when the magnet-poles are energized to stop the driven member and decrease or remove the friction, substantially as described.

11. The combination with the driven member of a clutch, of a projecting-pole armature and stop-arms rotating with and controlling the same, electro-magnet-poles, the said armature-poles in rotation approaching and receding from the magnet-poles, and an electro-magnetically operated detent for co-action with said stop arms, whereby the said member is stopped when the magnet-poles are energized, substantially as described.

12. The combination with the driven member of a clutch, of a projecting-pole armature and resilient stop-arms rotating with and controlling the same, electro-magnet-poles, the said armature-poles in rotating approaching and receding from the magnet-poles, and an electro-magnetically operated detent for co-action with said stop-arms, whereby the said member is stopped when the magnet-poles are energized, substantially as described.

13. The combination with the members of a friction-clutch, of a projecting-pole armature and stop-arms rigidly connected to the driven member, electro-magnet-poles, the said armature being so placed that the line joining (or the plane of) its poles is to one side of the line joining (or the plane of) the magnet-poles, electro-magnetically operated detent-devices for said stop-arms, and means for normally closing said clutch, whereby the armature and driven member of the clutch are moved away from the driver member and stopped on energizing the magnet-poles, substantially as described.

14. The combination with members of a friction-clutch, of a projecting-pole armature and resilient stop-arms rigidly connected to the driven member, electro-magnet-poles, the said armature being so placed that the line joining (or the plane of) its poles is one side of the line joining (or the plane of) the magnet-poles, electro-magnetically operated detent-devices for said stop-arms, and means for normally closing said clutch, whereby the armature and driven member of the clutch are moved away from the driver member and stopped on energizing the magnet-poles, substantially as described.

15. The combination with the members of a friction-clutch, of a projecting-pole armature and stop-arms rotating with and controlling the driven member thereof, electro-magnet-poles, the armature-poles in rotation approaching and receding from the magnet-poles, and being so placed that the line joining (or the plane of) its poles is to one side of the line joining (or the plane of) the magnet-poles, an electro-magnetically operated detent-device for the stop-arms, and devices connecting the members of the clutch to prevent the driven member from out-running the driver when the magnet-poles are energized to stop the driven member and move it from the driver member, substantially as described.

16. The combination with the members of a friction-clutch, of a projecting-pole armature, and stop-arms rotating with and controlling the driven member thereof, electro-magnet-poles, the armature-poles in rotating approaching and receding from the magnet-poles, and being so placed that the line joining (or the plane of) its poles is to one side of the line joining (or the plane of) the magnet-poles, an electro-magnetically operated detent device for the stop-arms, and a pawl-and-ratchet connection between the members of the clutch to prevent the driven member from out-running the driver when the magnet-poles are energized to stop the driven member and move it from the driver member, substantially as described.

17. In a friction clutch, the combination of a driving disk, spring fingers, a winding of fibrous material on said fingers, and means causing pressure between the members of the clutch, substantially as described.

18. In a friction-clutch, the combination of a driving disk, spring fingers, a winding of fibrous material on said fingers, a projecting-pole armature rotating with and controlling said fingers, electro-magnet-poles which the armature-poles approach and recede from during their rotation, and means pressing the members of the clutch together, whereby the driven member of the clutch is stopped when the magnet-poles are active, substantially as described.

19. In a friction-clutch, the combination of a driving disk, spring fingers, a winding of fibrous material on said fingers, a projecting-pole armature rigidly connected with said fingers, electro-magnet-poles toward and from which the armature-poles move as they rotate, said armature-poles being so placed that the line joining them (or their plane) is to one side of the line joining (or the plane of) the magnet-poles, and means pressing the members of the clutch together, whereby the driven member is stopped and moved from the driver when the magnet-poles are active, substantially as described.

Signed at New York, in the county of New York and State of York, this 30th day of March, A. D. 1894.

JOHN BURRY.

Witnesses:
CHARLES A. BRODEK,
RICHARD W. BARKLEY.